United States Patent [19]
Koyama et al.

[11] Patent Number: 5,719,729
[45] Date of Patent: Feb. 17, 1998

[54] MAGNETIC HEAD AND RECORDING AND REPRODUCING APPARATUS HAVING AN ARRANGEMENT FOR IMPROVING COINCIDENCE BETWEEN A MAGNETIC CENTER OF A READ HEAD AND PHYSICAL CENTER OF A WRITE HEAD

[75] Inventors: Naoki Koyama, Kokubunji; Yoshihiro Hamakawa, Urawa; Isamu Yuitoo, Odawara; Kanji Kawakami, Mito; Kazuo Shiiki, Kanagawa-ken; Masahiro Kitada, Hamura, all of Japan

[73] Assignee: Hitachi, Ltd., Tokyo, Japan

[21] Appl. No.: 990,769

[22] Filed: Dec. 15, 1992

[30] Foreign Application Priority Data

Dec. 16, 1991 [JP] Japan ................. 3-331063

[51] Int. Cl.$^6$ .............................. G11B 5/39; G11B 5/265
[52] U.S. Cl. ................................... 360/113; 360/121
[58] Field of Search ................................ 360/113, 119, 360/121, 125, 126

[56] References Cited

U.S. PATENT DOCUMENTS

| | | | |
|---|---|---|---|
| 4,967,298 | 10/1990 | Mowry | 360/113 |
| 5,111,352 | 5/1992 | Das et al. | 360/113 |
| 5,218,497 | 6/1993 | Tanabe et al. | 360/113 |
| 5,241,439 | 8/1993 | Michalek et al. | 360/113 |
| 5,257,148 | 10/1993 | Solhjell et al. | 360/121 |
| 5,270,895 | 12/1993 | Ruigrok et al. | 360/113 |
| 5,309,304 | 5/1994 | Naberhuis et al. | 360/113 |

OTHER PUBLICATIONS

IEEE Transactions on Magnetics; #5, vol. 26, pp. 2475–2477, Sep. 1990.

*Primary Examiner*—Jefferson Evans
*Attorney, Agent, or Firm*—Antonelli, Terry, Stout, & Kraus, LLP

[57] ABSTRACT

In an inductive-write, magnetoresistive-read type magnetic head having a magnetoresistive read head and an inductive write head superimposed on each other, the magnetic center of the read head is made more coincident with the physical center of the write head by a changing of a magnetization direction of a magnetoresistive element. The recording/reproducing apparatus using this magnetic head can thus have a good S/N ratio even if the track width is narrow.

4 Claims, 4 Drawing Sheets

MAGNETIC HEAD AND RECORDING AND REPRODUCING APPARATUS HAVING AN ARRANGEMENT FOR IMPROVING COINCIDENCE BETWEEN A MAGNETIC CENTER OF A READ HEAD AND PHYSICAL CENTER OF A WRITE HEAD

BACKGROUND OF THE INVENTION

This invention relates to an inductive-write, magnetoresistive-read head and a recording/reproducing apparatus having the inductive-write, magnetoresistive-read head.

In the magnetic head of the type in which the inductive-write head and the magnetoresistive-read head are combined to overlap, the inductive-write, magnetoresistive-read head easily to picks up the signal from the adjacent tracks as noise, thus reducing the S/N ratio when the write head and the read head have an alignment offset therebetween. Therefore, in order to improve the track density, it is most important to provide proper alignment between the write head and the read head at a high precision. In the modern technology for producing the inductive-write, magnetoresistive-read head, the alignment precision is about ±0.5 μm. The inductive-write, magnetoresistive-read head easily picks up the signal from the adjacent tracks as noise due to its positioning error. The positioning accuracy of this magnetic head is also about ±0.5 μm. Considering these precision and accuracy conditions, the track width of the read head is reduced to be narrower than that of the write head, thereby preventing the S/N ratio from being decreased by the noise from the adjacent tracks.

The related track width is described in IEEE TRANSACTION ON MAGNETICS, Vol. 26, pp 2475–pp 2477(1990).

As described above, when the track width of the read head is decreased to be narrower than that of the write head, the tolerance can be increased for the positioning accuracy and the alignment precision between the write head and the read head. However, when the track width of the read head is decreased, the reproduction output is also reduced, and thus the total S/N ratio of the apparatus decreases. This tendency becomes significant as the track density increases. Therefore, when the track width is narrow, it is difficult to prevent the S/N ratio from being decreased due to the noise from the adjacent tracks.

SUMMARY OF THE INVENTION

Accordingly, it is an object of the invention to provide a magnetic head of which the S/N ratio is little decreased even when the track width is narrow, and a recording/reproducing apparatus having this magnetic head, thereby solving the above problem.

In order to achieve the above object, according to this invention, there is provided an inductive-write, magnetoresistive-write type magnetic head having a magnetoresistive read head and an inductive write head superimposed on each other, wherein the magnetic center of the read head is more aligned with the physical center of the write head.

Also, there is provided a recording/reproducing apparatus using an inductive-write, magnetoresistive-write type magnetic head having a magnetoresistive read head and an inductive write head superimposed on each other, wherein the offset between the magnetic center of the read head and the physical center of the read head is larger than the alignment offset between the physical center of the write head and that of the read head, and the physical center of the write head lies between the magnetic center of the read head and the physical center of the read head.

In addition, there is provided a recording/reproducing apparatus using an inductive-write, magnetoresistive-write type magnetic head having a magnetoresistive read head and an inductive write head superimposed on each other, wherein the offset between the magnetic center of the read head and the physical center of the read head is smaller than the alignment offset between the physical center of the write head and that of the read head, and the magnetic center of the read head lies between the physical center of the write head and the physical center of the read head.

Moreover, there is provided a recording/reproducing apparatus using an inductive-write, magnetoresistive-write type magnetic head having a magnetoresistive read head and an inductive write head superimposed on each other, wherein this magnetic head is mounted on the back of a slider for its track width direction to be horizontal and for its slider bearing plane to be downward, and when the back of the slider is looked at, the physical center of the write head lies on the left of the physical center of the read head, and the average magnetization direction of a magnetoresistive element of the read head is upper-leftward or lower-rightward.

Also, there is provided a recording/reproducing apparatus using an inductive-write, magnetoresistive-write type magnetic head having a magnetoresistive read head and an inductive write head superimposed on each other, wherein this magnetic head is mounted on the back of a slider for its track width direction to be horizontal and for its slider bearing plane to be downward, and when the back of the slider is looked at, the physical center of the write head lies on the right of the physical center of the read head, and the average magnetization direction of a magnetoresistive element of the read head is lower-leftward or upper-rightward.

According to this magnetic head, the effect of the noise from the adjacent tracks can be reduced even if the track width is narrow.

Moreover, according to the recording/reproducing apparatus, even if an alignment offset occurs between the write head and the read head, it is possible to reduce the deviation between the physical center of the write head and the magnetic center of the read head. Thus, even if the track width is narrow, the effect of the noise from the adjacent tracks can be reduced.

DESCRIPTION OF THE PREFERRED EMBODIMENTS

Figure 6A:
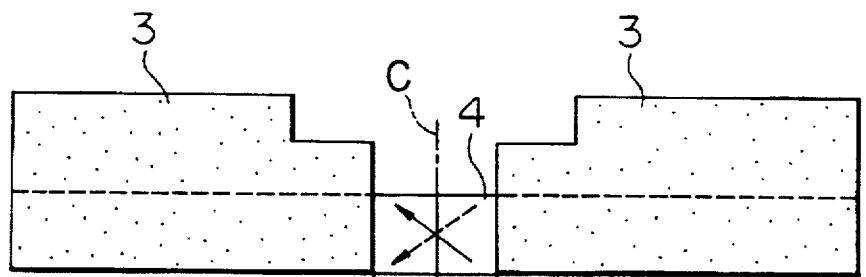
FIGS. 6A and 6B are graphs of relations between the magnetization direction and sensitivity distribution of the magnetoresistive element of the magnetic head.
Figure 6B:
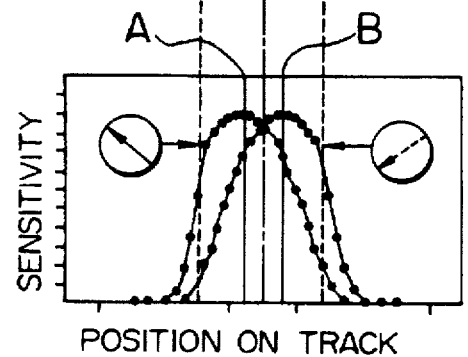

FIG. 6A is a cross-sectional diagram of a part of the magnetoresistive-read head of a magnetic head mounted on the trailing edge of a slider (not shown). In this figure, the magnetic head has its track width direction made coincident with the horizontal direction, and its slider bearing plane down. That is, FIG. 6A is a back view of the slider. FIG. 6B is a graph of the sensitivity to the track width direction. The sensitivity distribution is measured by moving the read head in the track width direction. In FIGS. 6A and 6B, before a transverse bias field is applied to a magnetoresistive element 4, the magnetoresistive element 4 is assumed to be magnetized in a leftward direction with respect to the drawing. When the transverse bias field is applied to the element 4, the element 4 is assumed to be magnetized in the upper-left direction (as indicated by the solid arrow in FIG. 6A). At this time, since the signal flux propagation direction changes in accordance with the magnetization direction, the magnetic center "A" lies on the left-hand side of the physical center "C" of the read head. The magnetic center is defined as the position at which the value of the integration of the sensitivity distribution of the read head in the track width direction from the right equals to that from the left. When the transverse bias field is applied to the magnetoresistive element 4 so that the element 4 can be magnetized in the lower-left direction (as indicated by the broken line in FIG. 6A), the magnetic center "B" lies on the right of the physical center "C" of the read head.

Figure 7A:
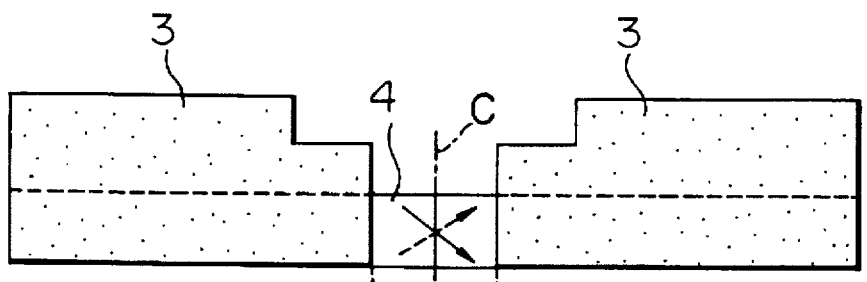
FIGS. 7A and 7B are graphs of relations between the magnetization direction and sensitivity distribution of the magnetoresistive element of the magnetic head.
Figure 7B:
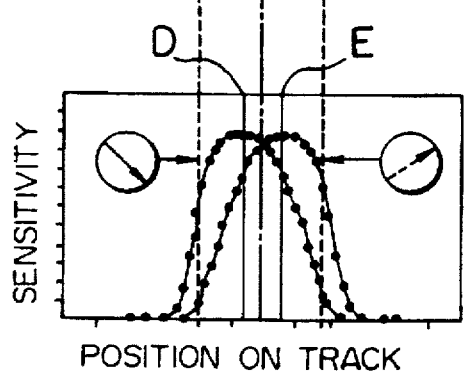

FIG. 7A shows a part of the magnetoresistive-read head, and FIG. 7B is a graph of the sensitivity distribution in the track width direction. In FIGS. 7A and 7B, the magnetoresistive element 4 is assumed to be magnetized in the rightward direction before the transverse bias field is applied to the element 4. When the transverse bias field is applied to the element 4 so that the element 4 can be magnetized in the lower-right direction (as indicated by the solid arrow in FIG. 7A), the magnetic center "D" of the read head lies on the left-hand side of the physical track width center "C" of the read head. When the transverse bias field is applied to the element 4 so that the element 4 can be magnetized in the upper-right direction (as indicated by the broken arrow in FIG. 7A), the magnetic center "E" of the read head lies on the right-hand side of the physical center "C" of the read head.

Therefore, in the inductive-write, magnetoresistive-read head formed by the integration of the write head on the read head, if the read head and the write head are previously offset and aligned so that the magnetic center of the read head more closely coincides with the physical center of the write head, the alignment offset, or the amount of deviation of the center between the physical center of the write head and the magnetic center of the read head can be reduced. Thus, even if the track width is narrow, the effect of the noise from the adjacent tracks can be decreased so that the S/N ratio is little decreased.

Figure 1A:
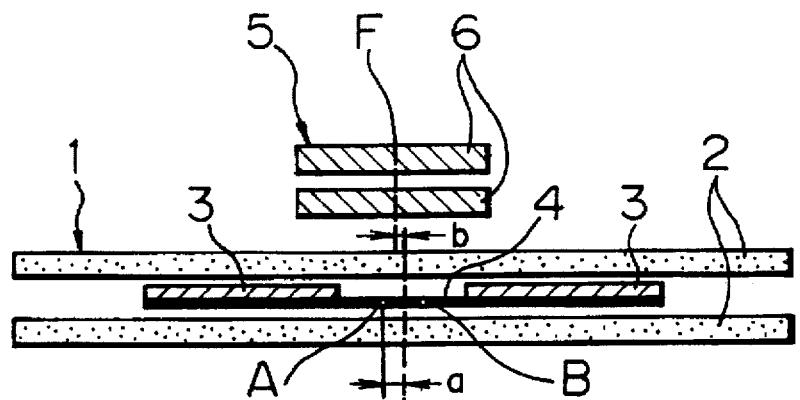
FIGS. 1A and 1B are diagrams of an embodiment of the magnetic head according to this invention.
Figure 1B:
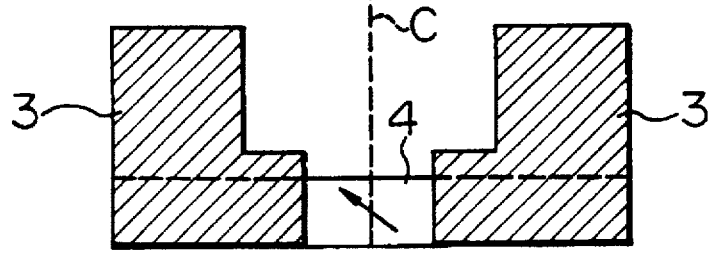

FIG. 1A is a cross-sectional view of the inductive-write, magnetoresistive-read head, and FIG. 1B is a cross-sectional view of the magnetoresistive element 4 of the head. The read head 1 is formed of two magnetic shields 2 and the magnetoresistive element 4 which is sandwiched therebetween and having electrodes 3 provided at both ends. A write head 5 is formed of two magnetic poles 6 between which a coil is interposed. This magnetic head is mounted on the back of the slider. In FIGS. 1A and 1B, the amount of deviation, or the offset "a" between the physical center C of the read head 1 and the magnetic center "A, B" of the read head 1 is larger than the amount of deviation, or alignment offset "b" between the physical center "F" of the write head 5 and the physical center "C" of the read head 1. In addition, the physical center "C" lies on the right-hand side of the physical center "F". In this case, if the transverse bias field is applied to the magnetoresistive element 4 so that the element 4 is magnetized in the upper leftward direction as indicated by the solid arrow in FIG. 1B, thus selecting the magnetic center "A", then the physical center "F" lies between the magnetic center "A" and the physical center "C", and thus the amount of deviation between the physical center "F" and the magnetic center "A" can be decreased.

The offset "a" is experimentally measured in advance, and the alignment offset "b" and the alignment offset direction are measured after the read head 1 and the write head 5 are overlapped on each other.

Figure 2A:
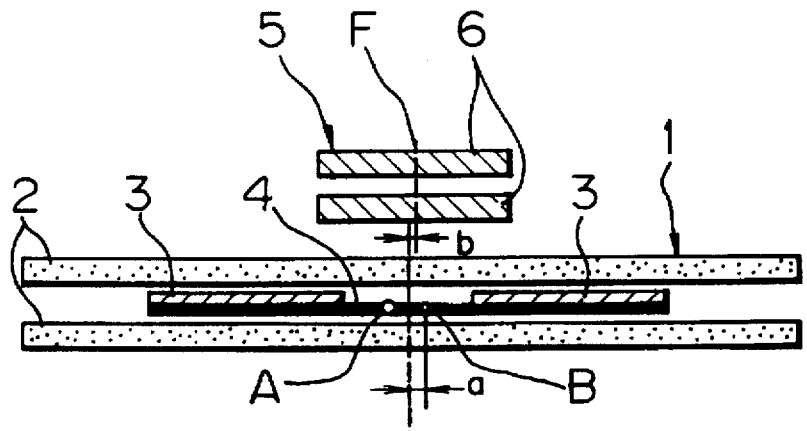
FIGS. 2A and 2B are diagrams of another embodiment of the magnetic head according to this invention.
Figure 2B:
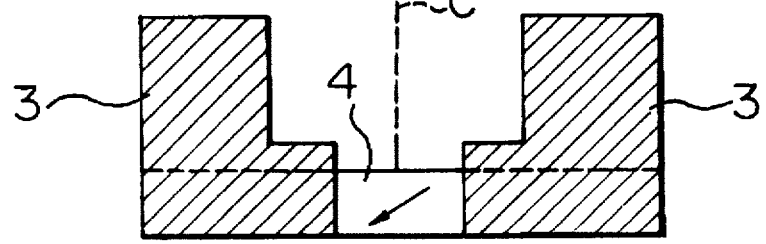

In FIGS. 2A and 2B, the alignment offset "B" is smaller than the offset "a", and the physical center "C" lies on the left-hand side of the physical center "f". In this case, if the transverse bias field is applied to the magnetoresistive element 4 so that the element 4 can be magnetized in the lower-leftward direction as indicated by the solid arrow in FIG. 2B, thus selecting the magnetic center "B", then the physical center "F" lies between the magnetic center "B" and the physical center "C", and thus the deviation between the physical center "F" and the magnetic center "B" can be reduced.

Figure 3A:
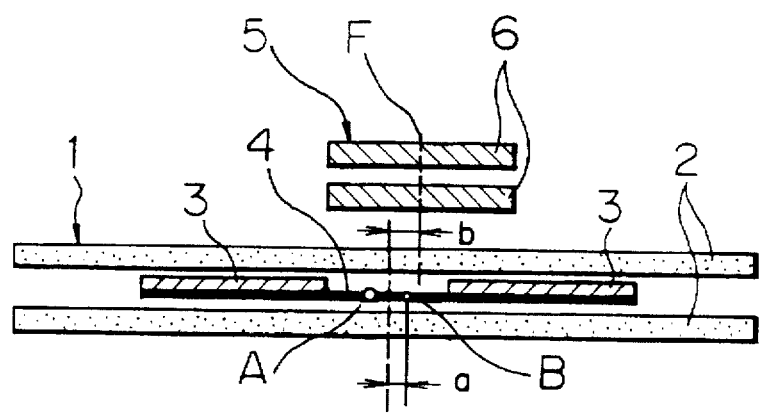
FIGS. 3A and 3B are diagrams of still another embodiment of the magnetic head according to this invention.
Figure 3B:
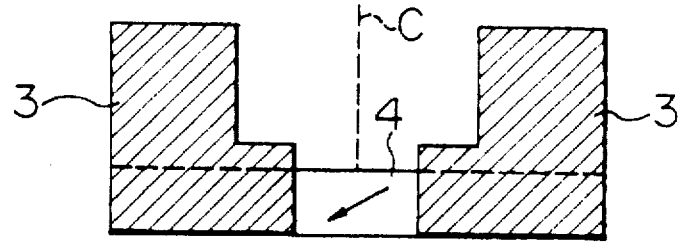

In FIGS. 3A and 3B, the alignment offset "b" is larger than the offset "A", and the physical center "C" lies on the left-hand side of the physical center "F". In this case, if the transverse bias field is applied to the magnetoresistive element 4 so that the element 4 is magnetized in the lower-leftward direction as indicated by the solid arrow in FIG. 3B, thus selecting the magnetic center "B", then the magnetic center "B" lies between the physical center "C" and the physical center "F", and thus the deviation between the physical center "F" and the magnetic center "B" can be reduced.

Figure 4A:
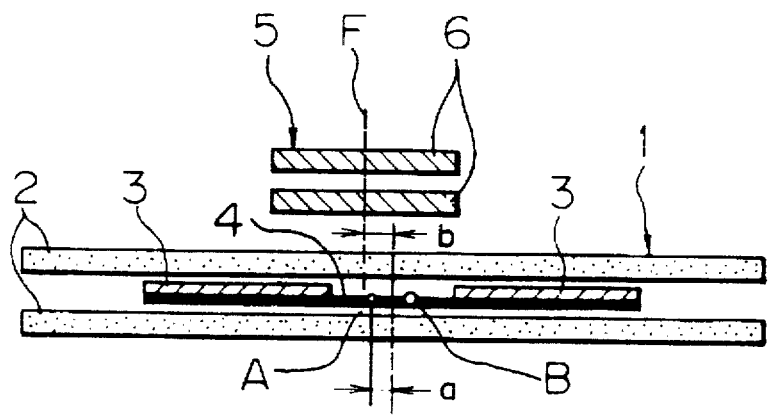
FIGS. 4A and 4B are diagrams of a further embodiment of the magnetic head according to this invention.
Figure 4B:
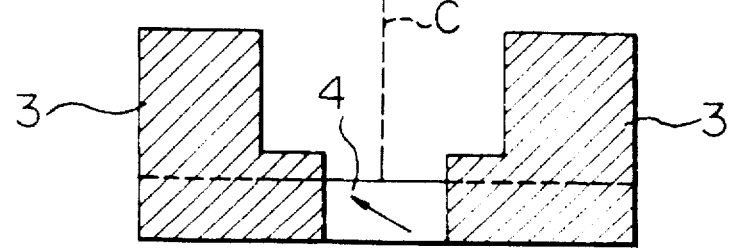

In FIGS. 4A and 4B, the alignment offset "b" is larger than the offset "a", and the physical center "C" lies on the right-hand side of the physical center "F". In this case, if the transverse bias field is applied to the magnetoresistive element 4 so that the element 4 is magnetized in the upper-leftward direction as indicated by the solid arrow in FIG. 4B, thus selecting the magnetic center "A", then the magnetic center "A" lies between the physical center "C" and the physical center "F", and thus the deviation between the physical center "F" and the magnetic center "A" can be reduced.

While in FIGS. 1A, 1B through 4A, 4B the magnetoresistive element 4 is magnetized in the leftward direction before the transverse bias direction is applied to the element 4, the same is also true when the element 4 is magnetized in the rightward direction in FIGS. 1A, 1B through 4A, 4B before the transverse bias field is applied to the element 4. This case is shown in FIGS. 7A and 7B. In FIGS. 7A and 7B, the magnetic center corresponding to that "A, B" in FIGS. 6a and 6B is "D, E". That is, if the magnetization direction of the element 4 is selected by the transverse bias field in accordance with the alignment offset "b" and the alignment offset direction, the deviation between the physical center "F" of the write head 5 and the magnetic center of the read head 1 can be reduced.

Thus, the read head 1 and the write head 5 are previously offset and aligned so that any one of the magnetic centers "A, B, C, D and E" of the read head 1 coincides with the physical center "F" of the write head 5, and the magnetization direction of the element 4 is changed in accordance with the alignment offset "b" and alignment offset direction. Then, even if an alignment offset occurs between the write head 5 and the read head 1, it is possible to reduce the deviation between the physical center "F" of the write head 5 and any one of the magnetic sensitivity centers "A, B, C, D and E" of the read head 1. Therefore, even if the track width is narrow, it is possible to reduce the effect of the noise from the adjacent tracks. As a result, the S/N ratio can be prevented from being lowered and thus the yield of the magnetic head upon production can be improved.

In this embodiment, the recorded track width is selected to be 5 μm, and the reproduced track width is selected to be 4 μm. In addition, the magnetic shields 2 and the electrodes 3 are made of a Co-based amorphous film of 2 μm thickness. The magnetoresistive element 4 is made of a permalloy film of 20 nm thickness. In order to operate the magnetoresistive element 4, a bias field is necessary to be applied thereto. Although not shown, a conductive film is provided adjacent to the magneto-resistive film and a shunt current to this conductive film generates the bias field being applied to the element 4. The conductive film is formed of an Nb film of 35 μm thickness. The magnetoresistive element 4 is 15 μm long and 3 μm high. The insulating films provided on the top and bottom of the magnetoresistive element 4 are made of an alumina film of 150 nm thickness. The electrodes 3 provided at both ends of the element 4 are made of a copper film of 150 nm thickness.

Figure 5:
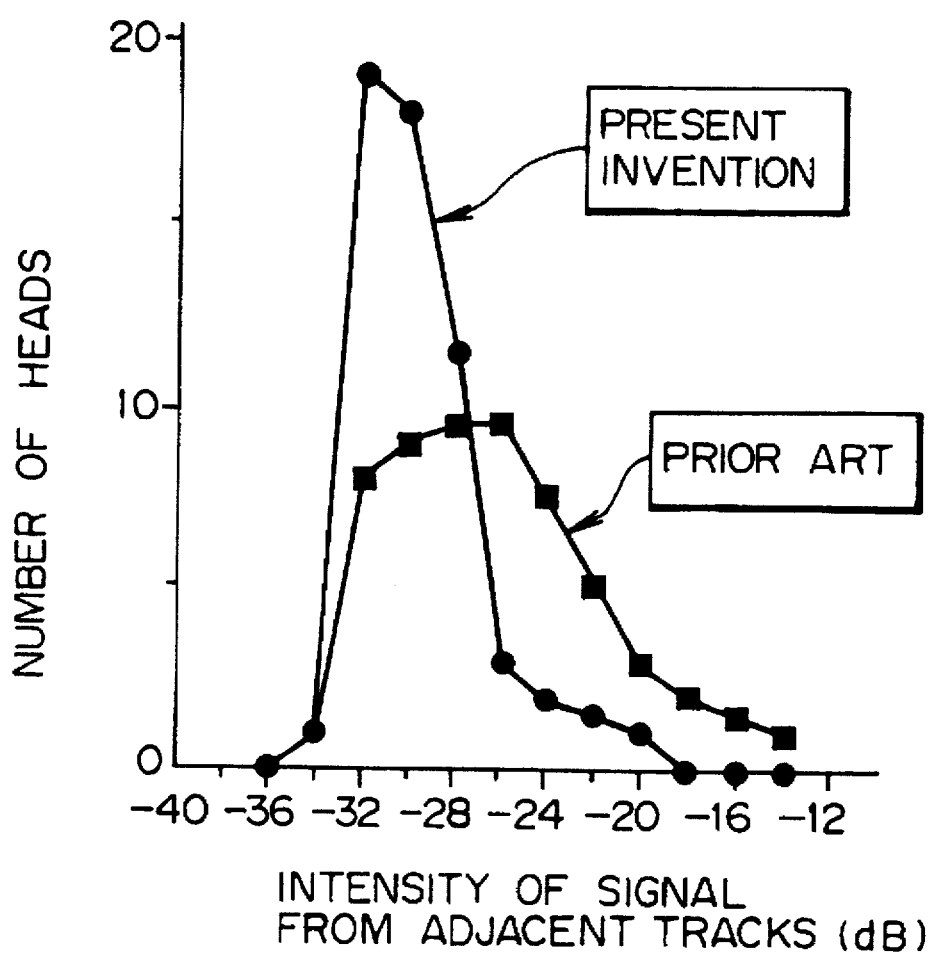
FIG. 5 is a graph of relations between the intensity of the signal from the adjacent tracks and the frequency, or the number of sample heads.

FIG. 5 shows the result of the examination of the effect of the invention. In this examination, 60 magnetic heads according to the invention and the same number of magnetic heads according to the prior art are used and tested. In the graph, the abscissa indicates the magnitude of the signal from the adjacent tracks relative to that of the signal on the recorded track, and the ordinate shows the number of the magnetic heads associated with the magnitude. In the conventional magnetic heads examined, the read head 1 and the write head 5 are combined so that the physical center "C" coincides with the physical center "F". In the magnetic head of the invention examined, those heads are previously offset (offset is 0.3 μm) by the amount corresponding to the offset "a" according to the technique of the invention and are then superimposed on each other. In addition, the direction in which the bias field is applied to the magnetoresistive element 4 is changed according to the alignment offset "b" and alignment offset direction. The precision at which these heads are overlapped is 3σ, or about 0.6 μm. In this test, the track-to-track spacing is 6.5 μm, and recorded track width is 5 μm, and the reproduced track width is 4 μm. Data of 80 kFCI is written on the track of interest, and data of 20 kFCI on the tracks adjacent to both sides of the track of interest. The flying height is 0.1 μm. In this graph, when the value of the signal from the adjacent tracks is low, the physical center "F" of the write head 5 is aligned with any one of the magnetic centers "A, B, D, and E" of the read head 1 at a high precision. From the figure, it will be seen that in the prior art the peak of the number of magnetic heads occurs at around −28 dB, while in this invention the peak occurs at about −32 dB. Since the distribution curve of this invention is steep, the effect of the adjacent tracks can be reduced. If the magnetic heads of which the adjacent track signal is −28 dB or below are decided as good products, the yield of the conventional head is 47%, while that of the invention is 86%.

While in the above embodiments the write head 5 is mounted, or stacked on the read head 1, this invention is not limited to this structure, but may be applied to the cases when the magnetoresistive element is provided within the gap of the write head and when part of the magnetic shield films serves as a recording magnetic pole. Moreover, while in the above embodiments the shunt bias method is used for flowing a current in the adjacent conductor, thereby applying a bias field to the magnetoresistive-read head 1, the commonly known soft adjacent layer or permanent magnet biasing method or the combination thereof may be used. In addition, the means for changing the magnetization direction of the magnetoresistive element can be changed in accordance with the biasing method. For example, the magnetic head using the permanent magnet biasing method can be realized by reversing the magnetization direction.

Thus, the magnetic head according to this invention can keep the S/N ratio high since the effect of the noise from the adjacent tracks can be reduced even if the track width is narrow.

Furthermore, according to the recording/reproducing apparatus of the invention, even if an alignment offset occurs between the write head and the read head, the deviation between the physical center of the write head and the magnetic center of the read head can be reduced, and thus even if the track width is narrow, the effect of the noise from the adjacent racks can be decreased. Accordingly, the S/N ratio can be prevented from being decreased, and hence the yield of the magnetic head can be improved.

As described above, the effect of the invention is remarkably excellent.

What is claimed is:

1. An inductive-write, magnetoresistive-read type magnetic head including a magnetoresistive read head and an inductive write head superimposed on each other, wherein a position of a magnetic center of said read head is set prior to write operations to improve coincidence between a magnetic enter of said read head and a physical center of said write head by selecting a magnetization direction of a magnetoresistive element such that an alignment offset amount defined between a physical track width center of said write head and that of said read head is smaller than an offset amount defined between the magnetic center of said read head and a physical track width center of said read head, and such that said read head and said write head are positioned so that the physical track width center of said write head is positioned between the magnetic center of said read head and the physical track width center of said read head.

2. An inductive-write, magnetoresistive-read type magnetic head including a magnetoresistive read head and an inductive write head superimposed on each other, wherein a position of a magnetic center of said read head is set prior to write operations to improve coincidence between a magnetic center of said read head and a physical center of said write head by selecting a magnetization direction of a magnetoresistive element such that an alignment offset amount defined between a physical track width center of said write head and that of said read head is larger than an offset amount defined between the magnetic center of said read head and a physical track width center of said read head, and such that said read head and said write head are positioned so that the magnetic center of said read head is positioned between the physical track width center of said write head and the physical track width center of said read head.

3. An inductive-write, magnetoresistive-read type magnetic head including a magnetoresistive read head and an inductive write head superimposed on each other, wherein a position of a magnetic center of said read head is set prior to write operations using a transverse bias field applied to a magnetoresistive element to improve coincidence between a magnetic center of said read head and a physical center of said write head such that an alignment offset amount defined between a physical track width center of said write head and that of said read head is smaller than an offset amount defined between the magnetic center of said read head and a physical track width center of said read head, and such that said read head and said write head are positioned so that the physical track width center of said write head is positioned between the magnetic center of said read head and the physical track width center of said read head.

4. An inductive-write, magnetoresistive-read type magnetic head including a magnetoresistive read head and an inductive write head superimposed on each other, wherein a position of a magnetic center of said read head is set prior to write operations using a transverse bias field applied to a magnetoresistive element to change a magnetization direction of said magnetoresistive element to improve coincidence between a magnetic center of said read head and a physical center of said write head such that an alignment offset amount defined between a physical track width center of said write head and that of said read head is larger than an offset amount defined between the magnetic center of said read head and a physical track width center of said read head, and such that said read head and said write head are positioned so that the magnetic center of said read head is positioned between the physical track width center of said write head and the physical track width center of said read head.

* * * * *